US010106365B2

(12) United States Patent
Nikkanen (10) Patent No.: US 10,106,365 B2
(45) Date of Patent: Oct. 23, 2018

(54) DEVICE AND METHOD FOR FORMING THREE DIMENSIONAL SHAPE TO ELONGATED MATERIAL

(71) Applicant: GLADSTONE PROPERTY HOLDINGS LIMITED, Road Town, Tortola (VG)

(72) Inventor: Jarkko Nikkanen, Helsinki (FI)

(73) Assignee: GLADSTONE PROPERTY HOLDINGS LIMITED, Road Town, Tortola (VG)

( * ) Notice: Subject to any disclaimer, the term of this patent is extended or adjusted under 35 U.S.C. 154(b) by 466 days.

(21) Appl. No.: 14/770,705

(22) PCT Filed: Feb. 28, 2014

(86) PCT No.: PCT/EP2014/053934
§ 371 (c)(1),
(2) Date: Aug. 26, 2015

(87) PCT Pub. No.: WO2014/131882
PCT Pub. Date: Sep. 4, 2014

(65) Prior Publication Data
US 2016/0016754 A1    Jan. 21, 2016

(30) Foreign Application Priority Data

Feb. 28, 2013  (FI) ..................................... 20135188

(51) Int. Cl.
*B65H 69/04*  (2006.01)
*A01K 91/04*  (2006.01)

(52) U.S. Cl.
CPC ........... *B65H 69/043* (2013.01); *A01K 91/04* (2013.01); *B65H 69/04* (2013.01); *B65H 2701/355* (2013.01)

(58) Field of Classification Search
CPC ..... B65H 69/04; B65H 69/043; B65H 69/046
See application file for complete search history.

(56) References Cited

U.S. PATENT DOCUMENTS

| 876,573 A | 1/1908 | Myers |
| 2,705,656 A * | 4/1955 | Shockey .............. B65H 69/043 289/1.5 |
| 2,913,270 A | 11/1959 | Sachsenröder, Sr. et al. |

(Continued)

FOREIGN PATENT DOCUMENTS

| JP | 2006176333 A * | 7/2006 | .......... B65H 69/046 |
| WO | WO 02/083540 A1 | 10/2002 | |
| WO | WO 2007/063175 A1 | 6/2007 | |

*Primary Examiner* — Shaun R Hurley
(74) *Attorney, Agent, or Firm* — Birch, Stewart, Kolasch & Birch, LLP (57) ABSTRACT

A device and method are provided for forming a knot to elongated material. The device includes a body, a central cavity inside the body, a material track along which the elongated material is guided in the device, the material track including an opening extending along the material track and open to the central cavity. The device further includes one or more barrier elements for blocking at least part of the opening for preventing the elongated material from escaping from the material track also prevents collapsing/folding of the material to the central cavity via the opening.

15 Claims, 7 Drawing Sheets

(56) References Cited

U.S. PATENT DOCUMENTS

| | | | | |
|---|---|---|---|---|
| 2,913,271 | A * | 11/1959 | Sachsenroder, Sr. | A01F 15/14 100/26 |
| 3,336,063 | A * | 8/1967 | Remmers | B65H 69/046 289/2 |
| 3,490,801 | A | 1/1970 | Feighery | |
| 3,591,217 | A * | 7/1971 | Melzer | B65H 69/046 289/2 |
| 7,883,122 | B2 * | 2/2011 | Orko | B65H 69/043 289/17 |
| 8,414,035 | B2 * | 4/2013 | Bell | B65H 69/04 289/13 |
| 9,475,671 | B2 * | 10/2016 | Adler | A61F 2/0022 |
| 2008/0315023 | A1 * | 12/2008 | Orko | A01K 91/04 242/157 R |

* cited by examiner

DEVICE AND METHOD FOR FORMING THREE DIMENSIONAL SHAPE TO ELONGATED MATERIAL

FIELD OF THE INVENTION

The present invention relates to a device for forming a three dimensional shape to elongated material. The present invention further relates to a method for forming a three dimensional shape to elongated material.

BACKGROUND OF THE INVENTION

Knots are usually made to elongated materials manually or with devices. Knots are conventionally used in fishing for attaching lures to fishing lines. Knots may also be used in textile applications for providing knots to yarns or in some other industrial or non-industrial applications. Knots are also produced in medical applications in connection with stitches, surgical operations or the like. In many situations it may be difficult to form knots manually due to weather conditions outside or due to other circumstances. Also some elongated materials have characteristics which make forming knots very difficult, such characteristics comprising rigidity, slipperiness or small diameter of the elongated material. For alleviating the above mentioned difficulties there are different kinds of devices for making knots. One prior art device for forming knots is described in International Patent Application having publication number WO 2007/063175 A1 and published Jun. 7, 2007.

The prior art devices for forming a knot comprise a body, a central cavity inside the body, a material track along which the elongated material is guided in the device, the material track comprising opening extending along the material track and open to the central cavity. The material track is shaped or provided such that it forms a preformed knot to the elongated material. The finished knot may be produced by tightening the preformed knot. The tightening may be carried out by pulling. For forming the knot elongated material is fed into the device such that the front end of the elongated material moves through the geometry of the material track such that the preformed knot is produced. After that the elongated material is pulled from the material track to the central cavity though the opening of the material track. After releasing the elongated material into the central cavity the preformed knot is tightened by pulling and the elongated material with the knot may be removed from the device. The apparatus may be designed such that the elongated material may be attached to an object with the knot. In some embodiments the object, such as a fishing lure, may be connected to the device such that the device automatically attaches the elongated material to the object when the knot is formed.

In the prior art devices the elongated material travels along the material track when it is pushed or drawn. The material track comprises the opening that is open to the central cavity of the device. The central cavity is provided for releasing the elongated material from the material track when the knot is preformed, such that the preformed knot may be tightened to a finished knot. The material track comprises of several turns and curves which the elongated material follows as it travels through the desired geometry of the material track. In the prior art devices the elongated material follows the track during travelling based on the internal tension of the elongated material. If the internal tension or diameter of the elongated material is not in optimal range the elongated material will not remain in the material track. Therefore the elongated material may escape from the material track to the central cavity or simply become stuck in the material track itself. If the internal tension of the elongated material is too high or the diameter too large, the elongated material cannot travel through the turns and curves of the material track. If the internal tension is too low or the diameter too small, the elongated material may fold in the material track preventing the elongated material to travel further in the material track or blocking the material track. According to the above mentioned the problem with the prior art devices is that their operation is limited to only certain types of elongated materials having certain internal tension, diameter and material. This means that separate devices have to be provided for different types of elongated materials.

BRIEF DESCRIPTION OF THE INVENTION

An object of the present invention is to provide a device and a method so as to overcome or at least alleviate the above mentioned problems. The objects of the invention are achieved with a device comprising a feed mechanism for moving the elongated material in the material track. The objects of the invention are further achieved with a method comprising feeding the elongated material through the material track with a feed mechanism provided to the device.

The preferred embodiments of the invention are disclosed in the dependent claims.

The invention is based on the idea of guiding the elongated material along at least part of the blocked material track inside the device. The guiding of the elongated material through the material track comprises providing the device with one or more shutter or guide elements. The one or more guide elements may be provided in the central cavity of the device such that the shutter elements guide the elongated material as it travels along the material track. The one or more shutter elements are arranged to prevent the elongated material escaping from the material track to the central cavity via the opening along at least part of the opening and/or block at least part of the opening for preventing the elongated material from escaping from the material track. For releasing the elongated material from the material track into the central cavity the shutter elements are removed from the central cavity or they are displaced in the central cavity in relation to the material track, such that the elongated material may enter the central cavity from the material track. The device may also alternatively or additionally be formed such that it may be opened for removing the elongated material from the material track. In one embodiment the device may be opened such that it may be split into at least first body part and second body part for opening the central cavity and removing the elongated material from the device via the central cavity. The device and method of the present invention may be used for forming elongated material, such as line, fishing line, thread yarn, wire, metal wire or the like for providing three dimensional configurations, knots, coil springs, windings or the like.

The shutter elements, or guide means, provided to the central cavity facilitate the travelling of the elongated material in the material track and also prevents collapsing/folding of the elongated material. The one or more shutter elements may also prevent the elongated material from escaping or exiting from the material track into the central cavity. In the present invention the shutter elements block the opening of the material track to the central cavity preventing the elongated material from becoming stuck or bending against the material track. Furthermore, the shutter elements make it possible to form knots to many different kinds of elongated materials. Therefore, the same device functions for a wide range of elongated materials with different diameters, internal tensions and material properties without need for modifications.

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
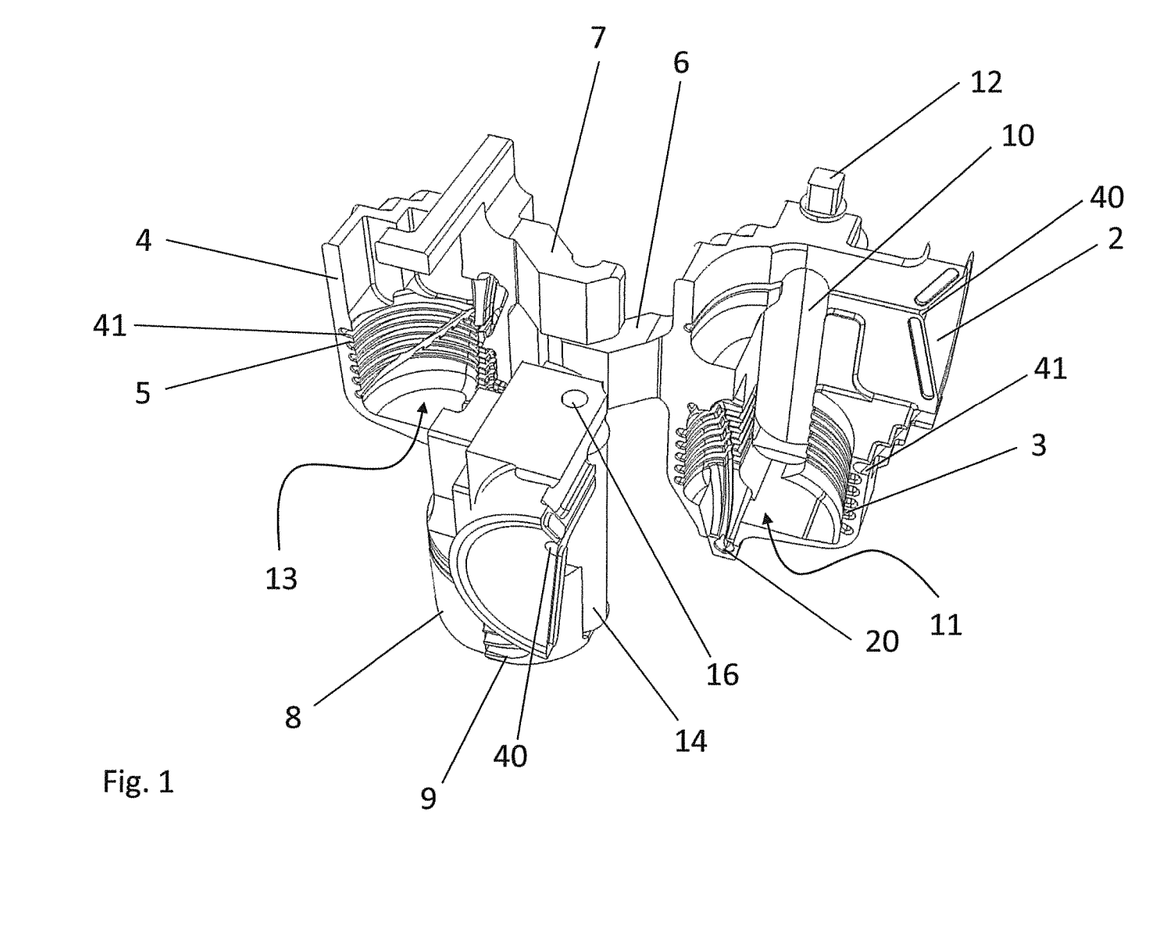
FIG. 1 shows a schematic perspective view of one embodiment of the device according to the present invention.

FIG. 1 shows schematically one embodiment of a device for forming knots according to the present invention. The device comprises a body formed from a first body part 2 and second body part 4. The body 2, 4 forms a closed structure. The device or at least the body of the device is arranged to be split such that the body may be opened. In the embodiment of FIG. 1 the body is split to the first and second body parts 2, 4 such that the device or body may be opened. The first and second body part 2, 4 are connected to each other with a hinge arrangement 6, 7 such that the first and second body part 2, 4 bay be moved in relation to each other. The hinge arrangement comprises a first hinge part 6 provided to the first body part 2 and a second hinge part 7 provided to the second body part 4 and also a hinge pin (not shown) for connecting the hinge parts 6, 7 pivotally together. It should be noted that the body parts 2, 4 may also be totally separable from each other without any hinge arrangement. Furthermore, the body parts 2, 4 may also be separable through a linear movement. In this case the body parts may be totally separable or they may be connected to each other for example with a connection bar allowing the linear movement. The body or the device may also be split into three or more body parts, thus not restricting the invention to any configuration of opening the device or the body. The body parts may be secured to each other with a locking mechanism or for example with a mortise joint or some other suitable means. In an alternative embodiment the device or the body of the device is one integral unit which may not be opened or split.

The device or the body 2, 4 of the device is at least partly hollow or comprises a cavity, meaning that the closed structure of the body 2, 4, or body parts, encloses a hollow cavity inside the body 2, 4. In the embodiment of FIG. 1 the device or the body 2, 4 comprises a central cavity 11, 13. In this embodiment the body 2, 4 comprises hollow central core provided with the central cavity 11, 13. The central cavity 11, 13 may be substantially cylindrical or conical or otherwise shaped hollow space. The present invention is not restricted to any certain shape of the central cavity 11, 13. In the embodiment of FIG. 1 the central cavity 11, 13 is formed by the first and second body parts 2, 4 when they are arranged in closed state against each other. In the embodiment of FIG. 1 the first and second body parts 2, 4 are substantially similar such that each of them form substantially half of the central cavity 11, 13. In an alternative embodiment the first and second body parts 2, 4 may form different kind of sections of the central cavity.

The device or the body 2, 4 of the device is further provided with a material track 3, 5 along which elongated material travels inside the device for forming a knot. The material track comprises an inlet opening 40 through which the elongated material is fed to the material track 3, 5. The material track also comprises an outlet opening 41 through which the elongated material exits the material track 3, 5, or the device or body 2, 4 of the device. The elongated material is fed to the material track through the inlet opening 40 and it travels along the material track 3, 5 to the outlet opening 41 through the certain geometry defined by the material track 3, 5. The geometry of the material track 3, 5 is formed such that the elongated material forms a preformed knot or alternative three dimensional shape when it is fed through the material track 3, 5. The material track 3, 5 shown in FIG. 1 is one example of geometry for providing a knot and it should be noted that the geometry of the material rack 3, 5 may vary in different applications for producing different kinds of knots. Thus the present invention is not restricted to any particular geometry of the material track 3, 5 or any particular type of knot or three dimensional shape.

Figure 2:
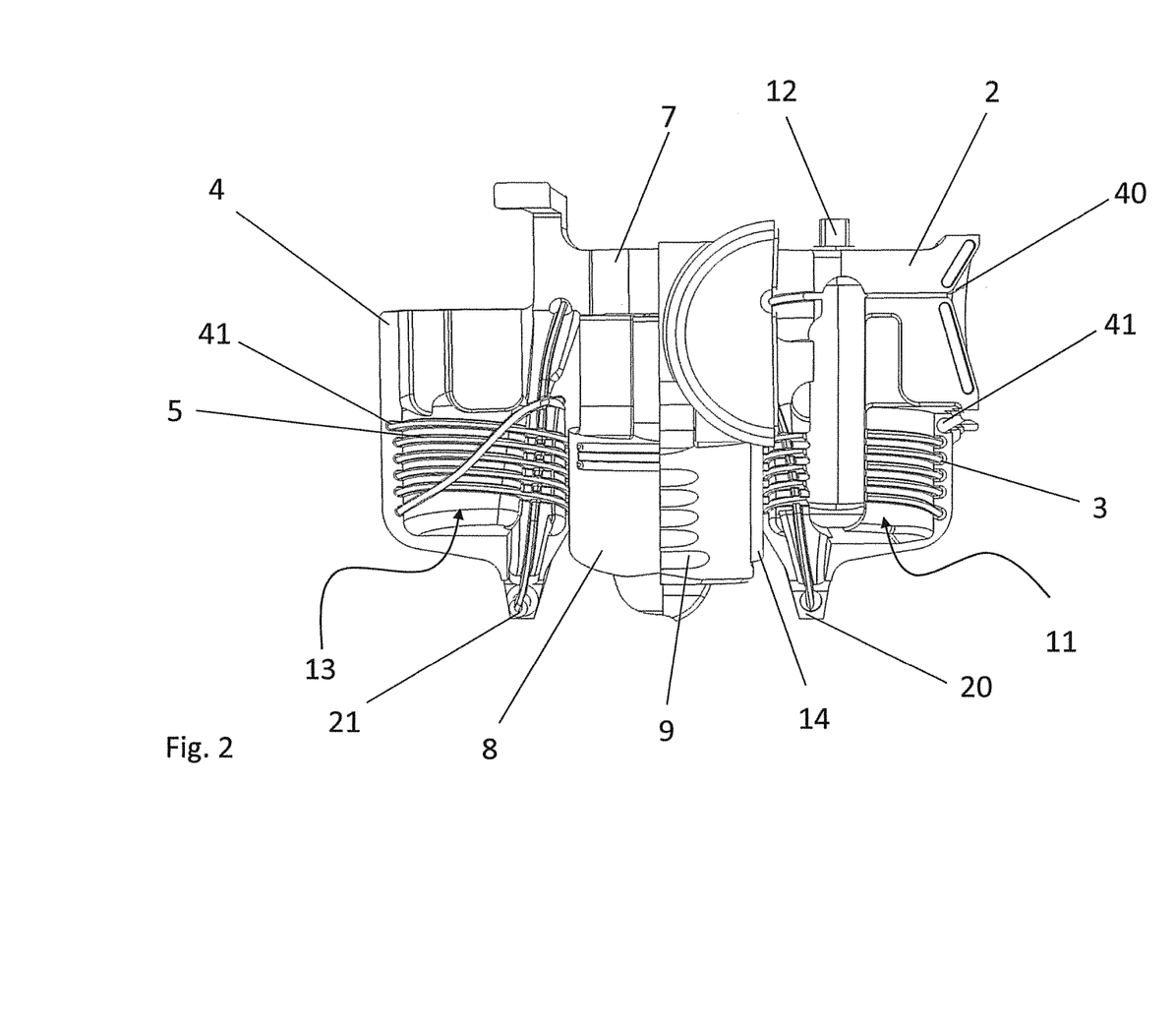
FIG. 2 shows another schematic perspective view of the embodiment of FIG. 1.
Figure 3:
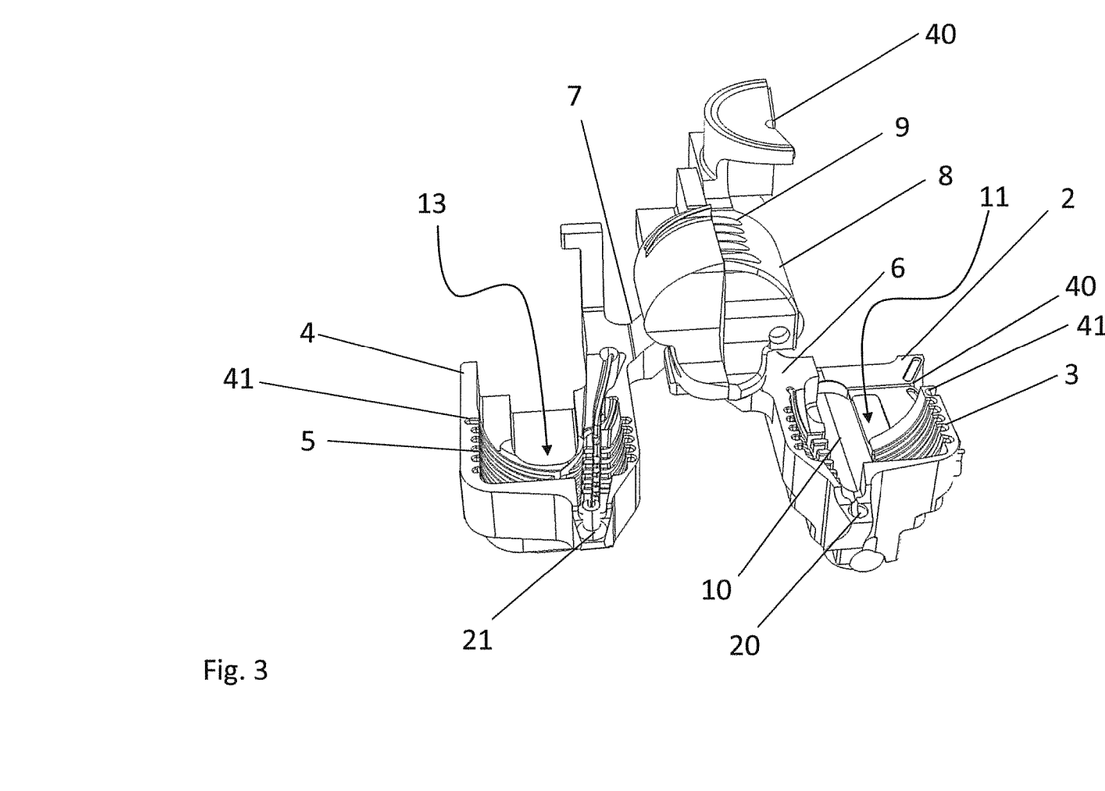
FIG. 3 shows yet another schematic perspective view of the embodiment of FIG. 1.

The material track 3, 5 is at least partly formed as a groove surrounding the central cavity 11, 13 and provided to the inner wall of the central cavity 11, 13. At least part of the material track 3, 5 is formed to the inner wall of the central cavity 11, 13, as shown in FIG. 2. In other words the material track comprises an opening 32 extending along at least part of the material track 3, 5 and open to the central cavity 11, 13. In the embodiment of FIG. 2, the material track 3, 5 forms loops around the central cavity 11, 13 for forming the knot. The opening 32 may extend along the whole material track 3, 5, or alternatively along only part of the material track 3, 5.

The device further comprises a feed mechanism for feeding the elongated material into the device and to the material track 3, 5 and further through the material track 3, 5. The front end of the elongated material is fed along and through the material track 3, 5 such that the geometry of the material track 3, 5 forms the preformed knot. The feed mechanism comprises of the embodiment of FIG. 2 comprises feed roll 10 having a rotation axis 12. The feed roll 10 may be driven manually, with electric motor or some other kinds of rotation means by driving the rotation axis 12. In this embodiment the feed roll 12 is provided to the first body part 2. The feed roll 10 may also be provided to the second body part 4. The feed mechanism may further comprise gear wheel or some other power transmission means for rotating the central axis 12 and further the feed roll 10. As shown in FIG. 1 the feed roll 10 extends substantially through the whole central cavity 11, 13 in transversal direction in relation to the material track 3, 5 such that the same feed roll 10 may be used for feeding the elongated material in several locations along the material track 3, 5. This means that the feed roll 10 intersects the material track 3, 5 at least in two different locations for enhancing the feeding of the elongated material through the material track 11, 13. However it should be noted that the feed roll 10 may also be provided as a short roll which provides only one contact point with the elongated material at the inlet opening or in the vicinity thereof. The feed mechanism is further provided with a counter surface provided at distance from the feed roll 10. The elongated material is fed such that it is pressed against the feed roll 10 and the counter surface in the gap between the feed roll 10 and the counter surface. The feed roll 10 and the counter surface may also be in contact with each other and the elongated material is fed through between them. The feed mechanism may be arranged to either push or pull the elongated material through the material track 3, 5. Furthermore, it should be noted that the feed mechanism may be any kind of feed mechanism and the present invention is not restricted to any kind of feed mechanism.

The device further comprises a connection point 20, 21 for attaching an object, such as a fishing lure, to the elongated material. A connection loop or the like of the object is placed or installed to the connection point 20, 21 for attaching the elongated material to the object with the formed knot. The material track 3, 5 is formed such that it leads the elongated material through the connection loop of the object in the connection point 20, 21 when the elongated material is fed through the material track 3, 5. The connection point 20, 21 is preferably provided such that the object may be secured to the connection point 20, 21 with the connection loop.

The device of the present invention further comprises one or more guide elements, or shutter elements, which may be arranged in the central cavity 11, 13 for guiding the elongated material along at least part of the material track 3, 5 and preventing the elongated material escaping from the material track 3, 5 to the central cavity 13, 15 via the opening 32.

In the embodiment of FIGS. 1 to 4 the shutter element is provided in the form of core element 8 arranged inside the central cavity 11, 13. As shown in the figures the core element 8 is connected to the first and second body part 2, 4 via the hinge arrangement 6, 7. The feed roll 10 may also be provided to the core element 8. In other words the core element 8 is directly connected to the hinge arrangement 6, 7 such that the first and second body parts 2, 4 may be moved away from the core element 8 when the device is opened. Thus the core element 8 moves in relation to the first and second body part 2, 4 when the device is opened and closed. In the closed state of the device the body parts 2, 4 surround the core element 8 and the core element 8 fills at least part of the central cavity 11, 13. The outer surface of the core element 8 may be formed to at least partly substantially conform the shape of the inner wall of the central cavity 11, 13. In the embodiment of FIGS. 1 to 4 the core element 8 is provided as substantially solid element, but it may also be at least partly hollow. Accordingly, the core element 8 prevents the elongated material escaping from the material track 3, 5 and thus closes opening 32 of the material track 3, 5 such that elongated material cannot exit the material track 3, 5 via the opening 32.

In an alternative embodiment the core element 8 may be directly connected to both or one of the body parts 2, 4 and not to the hinge arrangement 6, 7. Furthermore, the core element 8 may also be a totally separate element or elements which are removed from the device when it is opened. Alternatively the core element may be removed from the device when the device is in closed state, for example by pushing or pulling the core element(s) 8 out of the central cavity 11, 13. In this embodiment the device does not need to be formed to be opened. In a yet alternative embodiment the core element 8 may be provided displaceable in the central cavity 11, 13. The shutter elements may also be provided as some other kind of elements instead of the core elements. The shutter elements may for example be a shutter sleeve or sleeves arranged inside the central cavity 11, 13 or shutter flanges, nails or fingers extending from the body parts 2, 4. They could also be flanges/fingers separate from the body parts like pins or needles put in to place through the body parts. It should noted that the shutter elements are provided into the central cavity 11, 13 of the device when the device is in closed state, but the shutter elements may be implemented and formed in many different ways and the core element 8 and the shutter flanges are only exemplary embodiments. One alternative is a tube or straw which is introduced into the material track together with or separately from the elongated material and the elongated material is guided through the tube or straw. The tube or straw is thus arranged to prevent the elongated material escaping from the material track 3, 5 into the central cavity 11, 13. The tube or straw is made to be removed from the material track 3, 5 or to tear or rupture along the length of it such that elongated material may enter the central cavity 11, 13.

The shutter elements 8 are arranged to be positioned in vicinity or on or over the opening 32 of the material track 3, 5 such that they substantially block or close the opening 32 of the material track 3, 5 along at least part of the length of the material track 3, 5. The shutter elements 8 are arranged to prevent the elongated material escaping from the material track 3, 5 to the central cavity 11, 13 via the opening 32 along at least part of the opening. The shutter elements 8 further or alternatively are arranged to block at least part of the opening for preventing the elongated material from escaping from the material track 3, 5 to the central cavity 11, 13 via the opening 32 along at least part of the opening 32. This means that elongated material cannot exit the material track even when it is pulled or pushed until the opening 32 is opened by removing or dislocating shutter elements. When the shutter elements 8 are located to close at least part of the opening of the material track 3, 5 the elongated material may be supported against the shutter elements 8 as it travels in the material track 3, 5 and the shutter elements 8 thus guide the elongated material in the material track 3, 5 facilitating the feeding of the elongated material. The one or more shutter elements 8 are arranged to be removed from the central cavity 11, 13 or to be displaced in the central cavity 11, 13 for unblocking or opening the opening 32 of the material track 3, 5 and further allowing the elongated material to be released from the material track 3, 5 into the central cavity 11, 13. Thus the shutter elements 8 may be used for unblocking and blocking or closing the opening 32 of the material track 3, 5.

In the embodiment of FIGS. 1 to 4 the device can be opened or may be opened for removing the elongated material from the device via the central cavity 11, 13, such that opening the device moves the core element 8 in relation to the material track 3, 5 enabling the release of the elongated material from the material track 3, 5 as the core element 8 moves away from the opening of the material track 3, 5. Particularly the body 2, 4 of the device is formed to be split into at least first body part 2 and second body part 4 for opening the central cavity 11, 13 and removing the elongated material from the device via the central cavity 11, 13.

Figure 4:
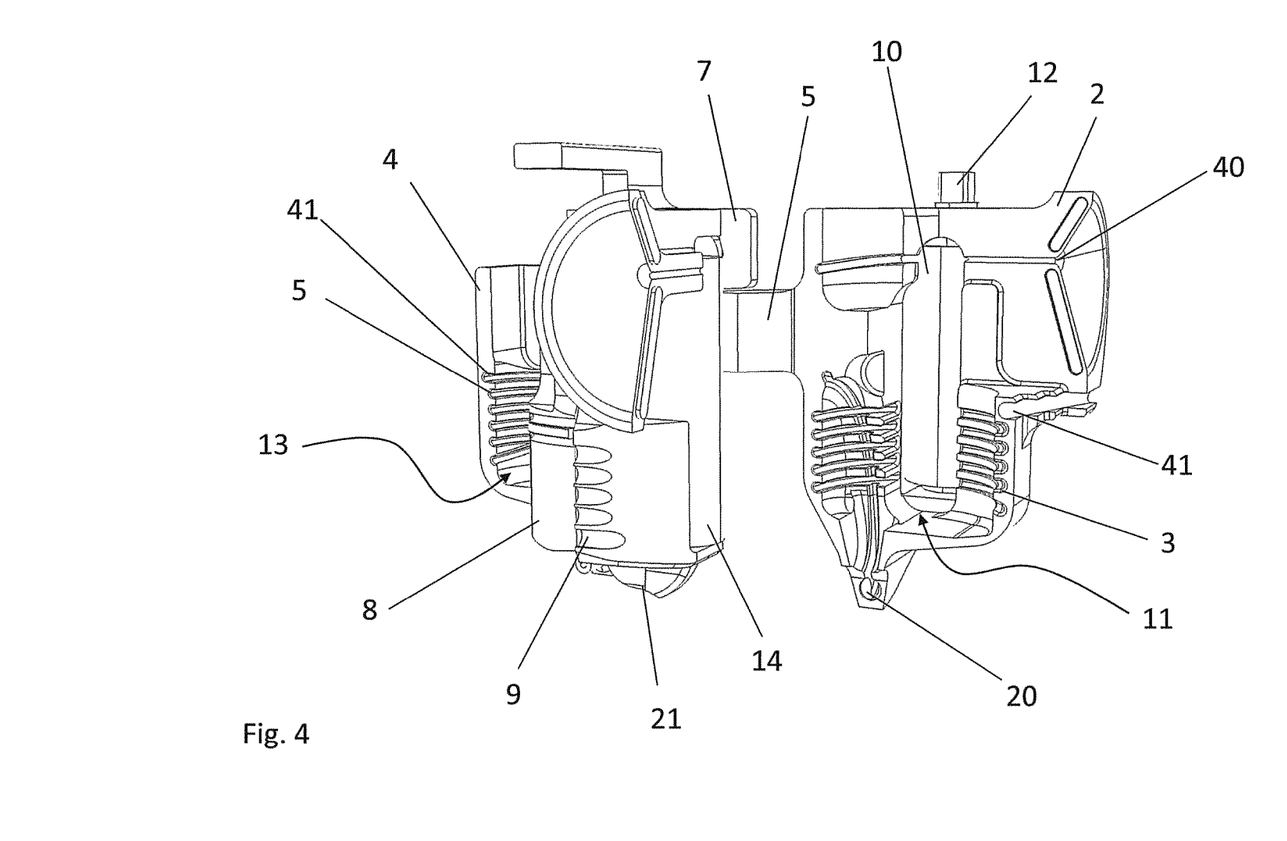
FIG. 4 shows still another schematic perspective view of the embodiment of FIG. 1.

The shutter elements of the present invention may further comprise guiding means in order to guide the elongated material in the material track 3, 5 during the formation of the knot. The guiding means are preferably arranged to facilitate the travel of the elongated material in the material track 3, 5 and enabling different kinds of elongated materials to the used in connection the device. In the embodiment of FIGS. 1 to 4, the core element 8 is provided with one or more guiding grooves 9 for guiding the elongated material as it travels along the material track 3, 5. The guiding grooves 9 may be arranged to be placed opposite the opening 32 grooves of the material track 3, 5 such that the guiding grooves 9 form part of the material track 3, 5. The guiding grooves 9 facilitate the travelling of the elongated material and prevent the elongated material from getting stuck in the material track 3, 5 and from exiting the material track 3, 5 during forming the knot. The guiding grooves 9 may extend only locally, as shown in FIG. 4, or they may extend around the whole core element 8.

The guide means of the guide elements may also comprise one or more guide rolls 14 for guiding the elongated material in the material track 3, 5. In the embodiment of FIG. 1 the guide roll 14 has a central axis 16 and it is arranged to rotate freely. In this embodiment the guide roll 14 forms the counter surface for the feed roll 10 and the elongated material is fed between the guide roll 14 and the feed roll 10 into the device by rotating the feed roll 10. The feed roll 10 and the guide roll 14 together straighten the elongated material and feed it straightened to the material track 3, 5 facilitating the travel of the elongated material along the material track 3, 5. The guide roll 14 may be extend through the whole central cavity 11, 13 in transversal direction in relation to the material track 3, 5, as shown in FIG. 1. Thus the guide roll 14 may guide the elongated material in several locations along the material track 3, 5. In the embodiment of FIGS. 1 to 4, the guide roll 14 extends substantially parallel with the feed roll 10 and has substantially same length as the feed roll 10. Alternatively the guide roll 14 may extend only locally in the central cavity 11, 13 such that it guides the elongated material in only one location along the material track 3, 5.

The feed roll 10 and/or the guide roll 14 may also comprise grooves (not shown) on the outer surfaces for guiding the elongated material in the location of the rolls 10, 14 and preventing the elongated material from escaping from the material track 3, 5 when it goes through the gap between the feed roll 10 and the guide roll 14. Tension may be created between the feed roll 10 and the guide roll 14 which would further prevent the elongated material from escaping the from the material track 3, 5. The tension may be created with spring arrangement or soft roll materials.

Figure 5:
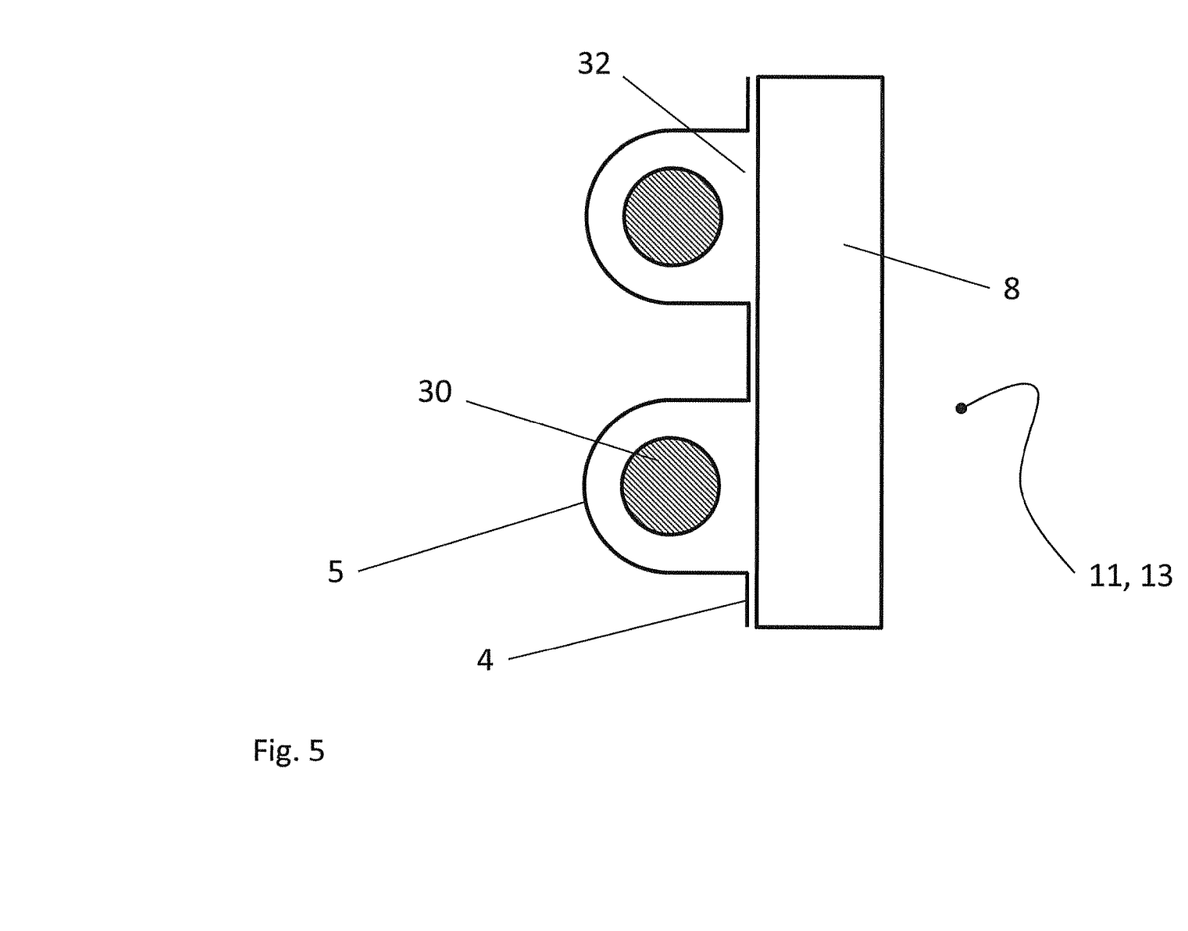
FIG. 5 shows an illustrative detailed view of one embodiment of the material track and the barrier element according to the present invention.

FIG. 5 shows the schematically cross section of the material track 5 of the second body part 4 of FIGS. 1 to 4 in which the elongated material 30 travels in the device. The material track 5 comprises an opening 32 open to the central cavity 11, 13 and thus the material track 5 is formed as a groove. The core element 8 substantially blocks at least part of the opening 32 along the material track 5 when the device is in closed state. Thus the core element 8 guides the elongated material 30 in the track and prevents it from escaping from the material track 5 to the central cavity 11, 13. In this embodiment the core element 8 is formed to block the material track 3, 5 of FIGS. 1 to 4 along several loops around the central cavity 11, 13.

Figure 6:
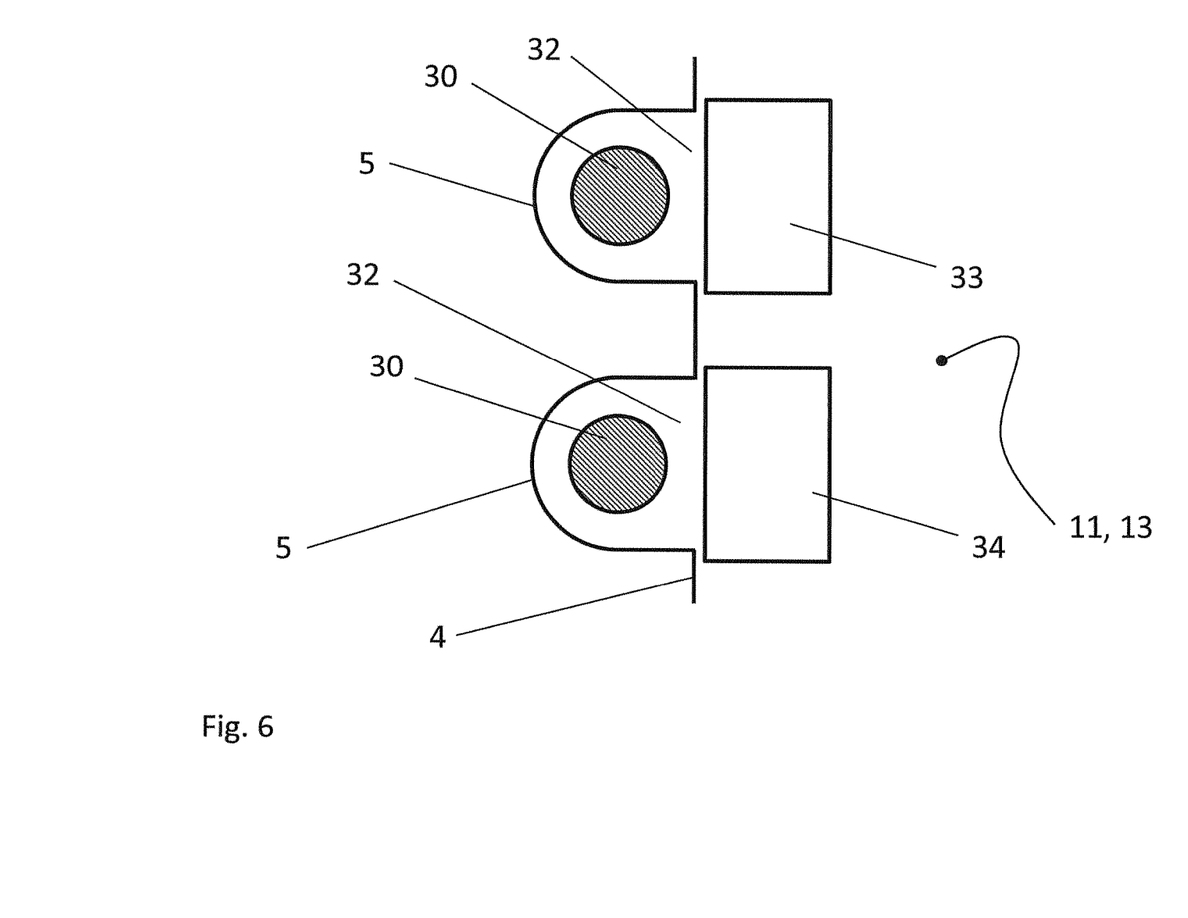
FIG. 6 shows an illustrative detailed view of another embodiment of the material track and the barrier element according to the present invention.
Figure 7:
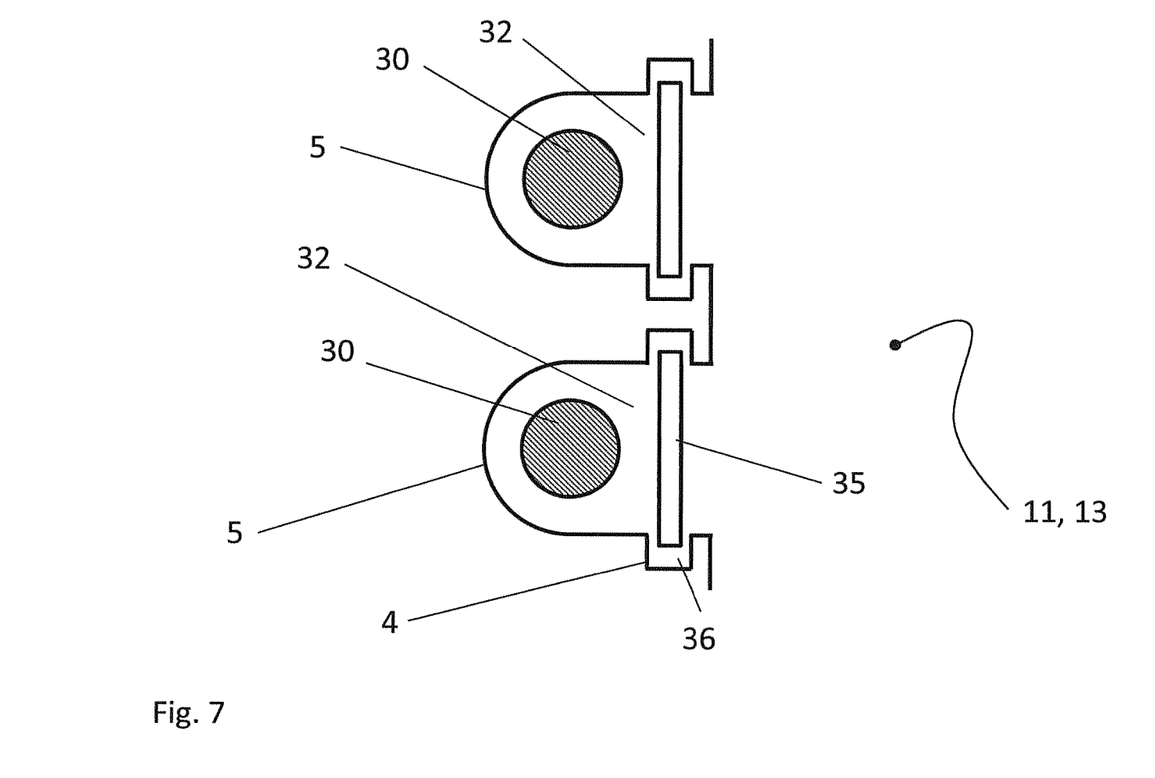
FIG. 7 shows an illustrative detailed view of yet another embodiment of the material track and the barrier element according to the present invention.

FIG. 6 shows an alternative embodiment, in which the guide means comprises one or more guide flanges 33, 34 extending inside the central cavity 11, 13. In this embodiment one guide flange 33, 34 is arranged to close the material track 5 along only one loop around the central cavity 11, 13. Alternatively one guide flange 33, 34 may also close two or more loops of the material track 3, 5 around the central cavity 11, 13. In this embodiment the guide flanges 33, 34 may be arranged to extend from the body parts 2, 4 of a body that can be split or opened such that the opening 32 is unblocked during opening the central cavity 11, 13 for removing the elongated material 30 from the device. This means that the first body part 2 may comprise of the first guide flanges 33, 34 and the second body part 4 may comprise of the second guide flanges 33, 34. When the device is in closed state the first guide flanges 33, 34 close the material track 5 provided to the second body part 4 and the second guide flanges 33, 34 block the material track 3 provided to the first body part 2. Therefore, the when the device is opened the guide flanges 33, 34 move away from the material track 3, 5 and the material track 3, 5 is unblocked to the central cavity 11, 13. FIG. 7 further shows an embodiment in which the shutter element comprises a movable shutter wall 35 provided to the body 2, 4 and in connection of the material track 3, 5 for blocking at least part of the opening 32. The shutter wall 35 may comprise a connection part for connecting the shutter walls to the elongated material 30 such that the shutter wall 35 may be moved together with the elongated material 30 for blocking the opening 32 during guiding the elongated material along the material track 3, 5. The body 2, 4 may be provided with a wall groove 36 extending along the material track 3, 5 in connection with the opening 32 and the shutter wall 35 is provided to move in the wall groove 36. The shutter wall is operatively connected to the feed roll 10 such that the shutter wall 35 may be moved together with the elongated material 30 for blocking the opening 32 during guiding the elongated material along the material track 3, 5.

The device of the present invention provides a method for forming a knot to an elongated material. The device for forming the knot comprises a body 2, 4, a central cavity 11, 13 inside the body 2, 4, a material track 3, 5 along which the elongated material 30 is guided in the device, the material track 3, 5 comprising opening 32 extending along the material track 3, 5 and open to the central cavity 11, 13. In the method elongated material is first fed into the material track of the device and the elongated material 30, or at least the beginning front end of the elongated materials moved through the material track 3, 5 such that the geometry of the material track 3, 5 forms a preformed knot to the elongated material 30. When the preformed knot is formed, the elongated material is released from the material track 3, 5 into the central cavity 11, 13 through the opening 32 of the material track 3, 5. Then the elongated material 30 is tightened such that a finished knot is formed to the elongated material 30 from the preformed knot.

According to the present invention moving the elongated material 30 further comprises guiding the elongated material 30 along at least part of the material track 3, 5 with one or more shutter elements 8, 33, 34 provided into the central cavity 11, 13 and preventing the elongated material from escaping from the material track 3, 5 through the opening 32 to the central cavity 11, 13 with shutter elements 8, 33, 34 during guiding the elongated material 30 along at least part of the material track 3, 5.

In one embodiment the guiding of the elongated material 30 or preventing the elongated material escaping from the material track 3, 5 is carried out by blocking at least part of the opening 32 of the material track 3, 5. In the present invention releasing the elongated material 30 from the material track 3, 5 further comprises removing the one or more shutter elements 8; 33, 34 from the central cavity 11, 13 or displacing the one or more shutter elements 8; 33, 34 in the central cavity 11, 13 for unblocking the opening 32 of the material track 3, 5 and allowing the elongated material 30 to be released from the material track 3, 5 to the central cavity 11, 13. Alternatively or additionally releasing the elongated material 30 from the material track 3, 5 further comprises opening the body 2, 4 for unblocking the opening 32 of the material track 3, 5 and allowing the elongated material 30 to be released from the material track 3, 5 in to the central cavity 11, 13. When the shutter elements 8, 33, 34 are removed or displaced in relation to the material track such that the opening 32 is unblocked, the elongated material 30 which is provided with the preformed knot may be released to the central cavity 11, 13 and the elongated material 30 and the preformed knot may be further tightened for tightening and forming finished knot.

It will be obvious to a person skilled in the art that, as the technology advances, the inventive concept can be implemented in various ways. The invention and its embodiments are not limited to the examples described above but may vary within the scope of the claims.

The invention claimed is:

1. A device for forming a three dimensional shape to elongated material, the device comprising:
    a body defining a central cavity inside the body, the central cavity having an inner wall;
    a material track along which the elongated material is guided in the device, the material track being provided to the inner wall of the central cavity and comprising an opening extending along the material track and open to the central cavity;
    one or more shutter elements arranged to prevent the elongated material escaping from the material track to the central cavity via the opening; and
    a feed mechanism with a feed roll arranged to be rotated for moving the elongated material in the material track.

2. The device according to claim 1, wherein the one or more shutter elements are arranged to block at least part of the opening during guiding the elongated material along the material track.

3. The device according to claim 1, wherein at least one shutter element is arranged in the central cavity for blocking at least part of the opening and guiding the elongated material along at least part of the material track, or
    wherein the material track is provided to the body and at least one shutter element is arranged to the body for blocking at least part of the opening and guiding the elongated material along at least part of the material track, or
    wherein the one or more shutter elements are arranged to be removed from the central cavity, or to be displaced in the central cavity for allowing the elongated material to be released from the material track, or
    wherein the one or more shutter elements are arranged to be moved in relation to the body for allowing the elongated material to be released from the material track.

4. The device according to claim 1, wherein the device is formed to be opened for removing the elongated material from the device via the central cavity, or the body is formed to be split into at least first body part and second body part for opening the central cavity and removing the elongated material from the device via the central cavity, or the body is formed to be split into at least first body part and second body part for opening the central cavity and removing the elongated material from the device via the central cavity and wherein the first body part and the second body part are connected to each other with a hinge arrangement for opening the central cavity.

5. The device according to claim 1, wherein the shutter element is formed as a core element provide inside the central cavity, or the core element is a separate part, or the core element is connected to at least one of the body parts or to a hinge arrangement.

6. The device according to claim 1, wherein the shutter element comprises one or more shutter flanges extending inside the central cavity.

7. The device according to claim 6, wherein the shutter flanges are arranged to extend from body parts of the body formed to be split such that the opening is unblocked during opening the central cavity for removing the elongated material from the device.

8. The device according to claim 1, wherein the one or more shutter elements comprises a guide configured to guide the elongated material in the material track during forming the elongated material.

9. The device according to claim 8, wherein the guide comprises one or more guiding grooves and/or the guide comprises a roll for guiding the elongated material in the material track.

10. The device according to claim 1, wherein the shutter element comprises a movable shutter wall provided to the body and in connection of the material track for blocking at least part of the opening.

11. The device according to claim 10, wherein the shutter wall comprises a connection part for connecting the shutter wall to the elongated material such that the shutter wall may be moved together with the elongated material for blocking the opening during guiding the elongated material along the material track.

12. The device according to claim 1, wherein the shutter wall is operatively connected to the feed roll such that the shutter wall may be moved together with the elongated material for blocking the opening during guiding the elongated material along the material track.

13. A method for forming a three dimensional shape to elongated material with a device comprising a body defining a central cavity inside the body, the central cavity having an inner wall, and a material track along which the elongated material is guided in the device, the material track being provided to the inner wall of the central cavity and comprising an opening extending along the material track and open to the central cavity, the method comprising the steps of:
    feeding elongated material into the material track;
    moving the elongated material through the material track;
    releasing the elongated material from the material track into the central cavity; and
    preventing the elongated material from escaping from the material track through the opening to the central cavity with shutter elements during guiding the elongated material along at least part of the material track,
    wherein the device further comprises a feed mechanism having a feed roll, the method comprising feeding the elongated material through the material track with the feed mechanism by rotating the feed roll.

14. The method according to claim 13, wherein releasing the elongated material from the material track comprises the steps of:
    removing the one or more shutter elements from the central cavity or displacing the one or more shutter elements in the central cavity for allowing the elongated material to be released from the material track, or moving the one or more shutter elements in relation to the body for allowing the elongated material to be released from the material track; or opening the body for allowing the elongated material to be released from the material track.

15. The device according to claim 1, wherein the feed roll includes a roll body extending through the central cavity in a transversal direction in relation to the material track to intersect the material track, and the roll body is rotatable throughout its entire length for moving the elongated material in the material track.

\* \* \* \* \*